H. L. BEACH.
SYSTEM OF ELECTRIC MOTOR CONTROL.
APPLICATION FILED APR. 12, 1912.
1,155,197.
Patented Sept. 28, 1915.
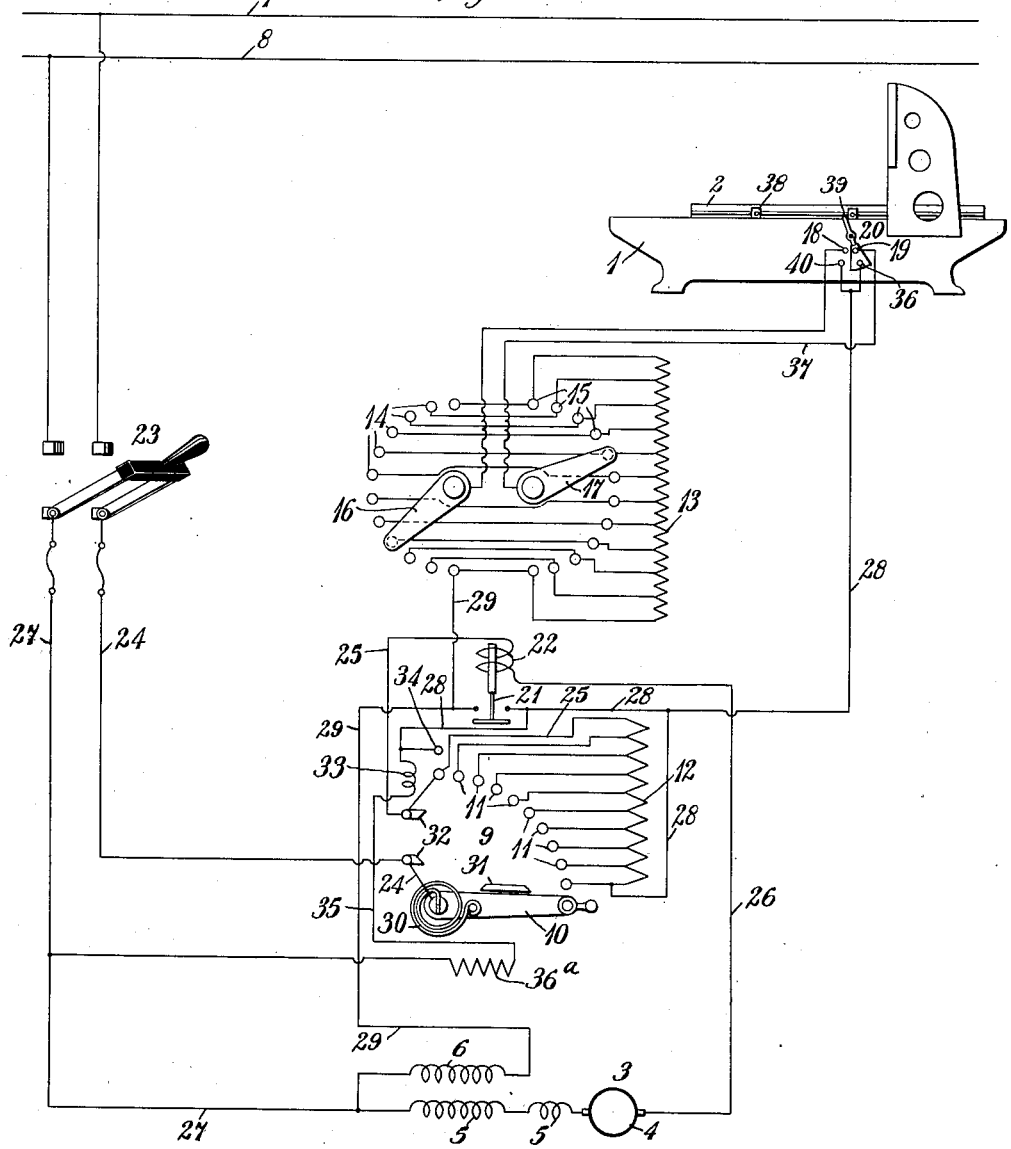
WITNESSES:
Fred H. Miller
R. J. Dearborn
INVENTOR
Howard L. Beach
BY
Wiley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,155,197.   Specification of Letters Patent.   Patented Sept. 28, 1915.

Application filed April 12, 1912. Serial No. 690,445.

*To all whom it may concern:*

Be it known that I, HOWARD L. BEACH, a citizen of the United States, and a resident of Edgewood Park, in the county of Allegheny and State of Pennsylvania, have invented a new and useful Improvement in Systems of Electric-Motor Control, of which the following is a specification.

My invention relates to systems of electric motor control and it has special reference to such systems as are adapted to govern the driving motors of planers and other machines having reciprocatory parts.

One object of my invention is to provide, in a system of the class above indicated, automatic means, dependent upon the driven mechanism for periodically adjusting the speed of the driving motor.

A second object of my invention is to embody, in a system of the aforesaid character, automatic means, dependent upon the current traversing the motor circuit for delaying the effect of the speed-adjusting means.

When planers and other machine tools or apparatus, having reciprocatory parts, are operated by electric driving motors, the direction of motor rotation is sometimes periodically reversed to effect the reciprocatory motion, while, in other cases, the motor operates continuously in the same direction, and mechanical means are employed for effecting the reciprocation of the moving parts.

My invention relates to control systems for governing electric driving motors of the latter class.

In order that the operation of the planer, or other driven device, with which my invention is employed, may be operated to the best advantage, I include automatic means dependent upon the reciprocating mechanism for alternately and periodically changing the speed of the motor to effect a desired cutting or working speed and a relatively high return speed. To avoid injuring the motor, I also embody, in the control system, means for temporarily strengthening the motor field or otherwise delaying the effect of the speed-changing mechanism.

Figure 1 of the accompanying drawing is a diagrammatic view of a control system embodying my invention and Fig. 2 is a detail view of a modified form of speed-adjusting apparatus.

Referring to the drawings, a planer, having a stationary base 1 and a reciprocatory bed 2, is adapted to be operated by an electric driving motor 3.

The motor 3 comprises an armature 4, a series field magnet winding 5 and a shunt field magnet winding 6, and it is supplied with energy from any suitable source (not shown), through supply circuit conductors 7 and 8.

In starting the motor from rest, a rheostatic controller 9, having a manually operated contact arm 10 and a plurality of stationary contact members 11, is employed for gradually reducing the active portion of a resistor 12, the terminals and a plurality of intermediate points of which are connected to the respective contact members 11.

When the armature resistor 12 is entirely excluded from the circuit, the speed of the motor may be adjusted by inserting more or less of a field-regulating resistor 13, the terminals and a plurality of intermediate points of which are connected to two sets of stationary contact members 14 and 15.

A pair of contact arms 16 and 17 are respectively adapted to coöperate with the contact members 14 and 15 and are respectively connected to contact members 18 and 19 of a switch 20 which is operated by the reciprocating bed 2 of the planer.

A relay switch 21, having an actuating coil 22, which is connected in series with the motor circuit, is adapted to short circuit the field-regulating resistor 13.

The circuit connections for and the operation of the control system are as follows: Assuming that the motor is at rest and that the switching devices occupy the positions shown in the drawings to operate the planer, a switch 23 is first closed and then the arm 10 of the rheostatic controller 9 is moved in a counter-clockwise direction. When the arm engages the first of the stationary contact members 11, an armature circuit is completed from line conductor 7 through switch 23 and a conductor 24 to the arm 10, thence through resistor 12 and conductor 25, coil 22 of relay switch 21, conductor 26, armature 4, field magnet windings 5 and conductor 27 to the opposite line conductor 8. A shunt field circuit is also completed from the arm 10, through a conductor 28, relay switch 21—which is closed immediately following the first rush of current-conductor 29, shunt field magnet winding 6 and conductor 27 to opposite line conductor 8. As the arm 10 successively engages the contact members 11, the resistor 12 is gradually excluded from the armature circuit until entire exclusion is effected. The arm 10 is preferably provided with a retracting spring 30 and carries a bridging contact member 31 which engages contact members 32 and short circuits the resistor 12 when the arm occupies its final position.

The arm 10 is preferably retained in its final position by a latch (not shown), which is actuated, in the usual manner, by a magnet coil 33.

The coil 33 is supplied with energy from a contact member 34, which is engaged by the end of the arm 10 when in its final position, circuit being completed through a conductor 35 and a resistor 36ª to conductor 27.

The circuit of the shunt field magnet winding is completed directly from the arm 10, through the contact member 34 and conductor 28.

As soon as the current in the armature circuit falls below a predetermined value, the relay switch 21 opens and the speed of the motor is determined by the switch 20 and the resistor 13. With the switch 20 in the position shown, a circuit is completed, as soon as relay switch 21 is open, from conductor 28, through contact members 36 and 19 of switch 20, conductor 37, arm 17, a portion of resistor 13, depending on the adjustment of the arm 17, and conductor 29 to the field magnet winding 6, the opposite terminal of which is connected to the supply circuit.

Since the planer bed is shown in position to take its cutting stroke, the arm 17 should be set to produce a relatively low speed which, however, may be adjusted as desired, by setting the arm. When the planer bed reaches the opposite end of its stroke, a stop 38 engages a projection 39 of the switch arm, thereby throwing the switch into its opposite position. During this entire period, the driving motor is operating continuously, some mechanical means, as above indicated, being utilized for producing the reciprocatory movement of the bed.

As soon as the position of the switch 20 is changed, a field circuit is established from conductor 28, through contact members 40 and 18 and contact arm 16, to an intermediate point in the resistor 13, depending on the setting of the arm 16. Since the setting of the arm 16 determines the return stroke of the planer, it should be arranged to produce a relatively high speed which may be readily adjusted to the size of the planer and the particular work which it is handling.

When the switch 20 is thrown from the one position to the other, the sudden change in the field strength may momentarily produce a relatively large current in the armature circuit, in which case, the relay switch 21 will be closed and will temporarily short circuit the entire resistor 13.

The switch 20 is preferably provided with some spring mechanism for making it act quickly, but such arrangements are well known and form no part of my present invention.

I deem it unnecessary to illustrate any specific mechanical means, such as a pair of driving pulleys and a belt-shifting device for producing a reciprocatory movement of the planer bed, since these devices are in general use and do not constitute a part of my invention.

It may be of advantage to effect a predetermined difference in the cutting and return stroke of the planer bed by varying the size of the driving pulleys, the field regulating resistance being relied upon merely for the purpose of adjusting the two speeds independently to suit the condition of operation.

As shown in Fig. 2 of the drawings, the resistance controlling arms 16 and 17 may be replaced by contact arms 41 and 42 which respectively govern different sections of the resistor 13 instead of covering the same ground. By this arrangement, the return speed of the planer cannot be made less than its highest cutting speed, and vice versa.

I desire that variations which do not depart from the spirit of my invention shall be included within its scope.

I claim as my invention:

1. In a control system, the combination with a driven mechanism, a driving motor, and two manually adjustable means for predetermining two selective rates of motor speed, of means dependent upon the driven mechanism for alternately and periodically connecting said manually adjustable means in circuit for the selected motor speed.

2. In a control system, the combination with a driven mechanism, a driving motor, and manually adjustable means for predetermining two different rates of speed thereof, of means dependent upon the driven mechanism for alternately and periodically connecting said manually adjustable means in circuit for the different motor speeds.

3. In a control system, the combination with a reciprocatory mechanism, a continuously rotating driving motor having a shunt field magnet winding, a resistor having one terminal permanently connected to a terminal of said winding and two independent manually operable devices for varying the active length of said resistor, of means dependent upon the reciprocatory mechanism for connecting said manually operable devices respectively in circuit in accordance with the forward and the reverse movements of said mechanism.

4. In a control system, the combination with a driven mechanism, a driving motor having an armature and a field magnet winding, a resistor having spaced contact members, two independent contact arms adapted to engage said members, and means dependent upon the driven mechanism for periodically connecting said arms alternately to said field magnet winding.

5. In a control system, the combination with a driven mechanism, a driving motor having an armature and a field magnet winding, a resistor, two independent devices for including desired portions of said resistor in the circuit of the field magnet winding, and means dependent upon the driven mechanism for alternately and periodically connecting said devices to the field magnet winding.

6. In a control system, the combination with a driven mechanism, an electric driving motor having an armature and a field magnet winding, a resistor in series with the field magnet winding, means dependent upon the driven mechanism for alternately including a greater or less amount of said resistor in circuit with said winding, and means dependent upon the current in the motor circuit for temporarily short circuiting the entire field resistor.

7. In a control system, the combination with a driven mechanism, a driving motor having a field-regulating resistor, a pair of independent arms for effecting the resistor regulation, and means dependent upon the driven mechanism for completing the field circuit through first the one and then the other of the regulating arms.

8. In a control system, the combination with a driven mechanism, a driving motor having a field-regulating resistor, a pair of independent arms for effecting the resistor regulation, means dependent upon the driven mechanism for completing the field circuit through first the one and then the other of the regulating arms, and means dependent upon the current in the motor circuit for excluding the entire field resistor.

9. In a control system, the combination with a reciprocatory mechanism, an electric driving motor adapted to operate continuously in one direction, a field-regulating resistor for the motor, a pair of independently adjustable regulating arms for determining the active portion of the resistor in circuit, and a switch operated by the reciprocatory mechanism for alternately completing the field circuit through the two regulating arms as the reciprocatory mechanism reaches first the one and then the other end of its travel.

10. In a control system, the combination with a reciprocatory mechanism, an electric driving motor adapted to operate continuously in one direction, a field-regulating resistor for the motor, a pair of independent adjustable arms for determining the active portion of the resistor in circuit, and a switch operated by the reciprocatory mechanism for alternately completing the field circuit through the two regulating arms as the reciprocatory mechanism reaches first the one and then the other end of its travel, and a series relay switch dependent upon the current in the motor circuit for short circuiting the entire field-regulating resistor.

In testimony whereof, I have hereunto subscribed my name this 4th day of April 1912.

HOWARD L. BEACH.

Witnesses:
 GEO. W. HUEY,
 B. B. HINES.